United States Patent
Lee

(10) Patent No.: US 11,206,217 B2
(45) Date of Patent: Dec. 21, 2021

(54) METHOD, DEVICE, AND SYSTEM FOR CONTROLLING QOS OF APPLICATION

(71) Applicant: Samsung Electronics Co., Ltd., Suwon-si (KR)

(72) Inventor: Ok Seon Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/733,059

(22) PCT Filed: Nov. 6, 2018

(86) PCT No.: PCT/KR2018/013372
§ 371 (c)(1),
(2) Date: May 4, 2020

(87) PCT Pub. No.: WO2019/088797
PCT Pub. Date: May 9, 2019

(65) Prior Publication Data
US 2020/0351208 A1    Nov. 5, 2020

(30) Foreign Application Priority Data
Nov. 6, 2017    (KR) .......................... 10-2017-0146696

(51) Int. Cl.
*H04L 12/851*    (2013.01)
*H04L 12/813*    (2013.01)
(Continued)

(52) U.S. Cl.
CPC .............. *H04L 47/24* (2013.01); *H04L 47/20* (2013.01); *H04L 47/805* (2013.01); *H04W 28/0268* (2013.01); *H04W 28/24* (2013.01)

(58) Field of Classification Search
None
See application file for complete search history.

(56) References Cited

U.S. PATENT DOCUMENTS 8,379,517 B2    2/2013    Chu et al.
8,942,095 B2    1/2015    Abel et al.
(Continued)

FOREIGN PATENT DOCUMENTS

JP    2005-109536 A    4/2005
KR    10-1352005 B1    1/2014
(Continued)

OTHER PUBLICATIONS

Supplementary European Search Report dated Sep. 2, 2020 in connection with European Patent Application No. 18 87 2710, 14 pages.

(Continued)

*Primary Examiner* — Anh Vu H Ly

(57) ABSTRACT

A method of controlling Quality of Service (QoS) of an application includes: determining a main type of traffic of the application; determining a QoS control policy to be applied to each of a plurality of flows generated by execution of the application according to the determined main type of traffic; obtaining performance information about traffic of the application using traffic transmitted and received through the plurality of flows; and changing a QoS control policy to be applied to at least one of the plurality of flows, based on the obtained performance information about the traffic.

15 Claims, 10 Drawing Sheets

(51) Int. Cl.
*H04L 12/927* (2013.01)
*H04W 28/02* (2009.01)
*H04W 28/24* (2009.01)

(56) References Cited

U.S. PATENT DOCUMENTS

| | | | |
|---|---|---|---|
| 9,007,899 B2 | 4/2015 | Kotecha et al. | |
| 9,112,809 B2* | 8/2015 | Karlsson | H04L 43/026 |
| 9,668,166 B2 | 5/2017 | Santhanam et al. | |
| 9,971,511 B2 | 5/2018 | Niu et al. | |
| 10,355,982 B2 | 7/2019 | Seo et al. | |
| 10,637,635 B2 | 4/2020 | He et al. | |
| 10,652,151 B2 | 5/2020 | Lee et al. | |
| 10,721,098 B2* | 7/2020 | Maskalik | G06F 9/45558 |
| 2011/0242978 A1 | 10/2011 | Klein et al. | |
| 2015/0026749 A1 | 1/2015 | Bringuier et al. | |
| 2016/0073413 A1 | 3/2016 | Abrahams et al. | |
| 2016/0105728 A1 | 4/2016 | Schmidmer et al. | |
| 2016/0234099 A1* | 8/2016 | Jiao | H04L 47/2441 |
| 2018/0220325 A1 | 8/2018 | Lee et al. | |

FOREIGN PATENT DOCUMENTS

| | | |
|---|---|---|
| KR | 10-2014-0134677 A | 11/2014 |
| KR | 10-2015-0032611 A | 3/2015 |
| KR | 10-2016-0030710 A | 3/2016 |
| KR | 10-2017-0066298 A | 6/2017 |
| KR | 10-2017-0082438 A | 7/2017 |
| WO | 2014/126784 A1 | 8/2014 |

OTHER PUBLICATIONS

International Search Report dated Feb. 7, 2019 in connection with International Patent Application No. PCT/KR2018/013372, 2 pages.
Written Opinion of the International Searching Authority dated Feb. 7, 2019 in connection with International Patent Application No. PCT/KR2018/013372, 9 pages.

* cited by examiner

301

| Version | IHL | Type of Service | Total Length | |
|---|---|---|---|---|
| Identification | | | Flags | Fragment Offset |
| time to Live | | Protocol (310) | Header Checksum | |
| Source Address (320) | | | | |
| Destination Address (330) | | | | |
| Options | | | | Padding |
| Source Port (340) | | | Destination Port (350) | |
| Sequence Number | | | | |
| Acknowledgement Number | | | | |
| Data Offset | | URG ACK PSH RST SYN FIN | Window | |
| Checksum | | | Urgent Pointer | |
| TCP Options | | | | Padding |
| TCP Data | | | | |

1

METHOD, DEVICE, AND SYSTEM FOR CONTROLLING QOS OF APPLICATION

CROSS-REFERENCE TO RELATED APPLICATIONS

This application is a 371 National Stage of International Application No. PCT/KR2018/013372, filed Nov. 6, 2018, which claims priority to Korean Patent Application No. 10-2017-0146696, filed Nov. 6, 2017, the disclosures of which are herein incorporated by reference in their entirety.

BACKGROUND

1. Field

The disclosure relates to a method and device for controlling Quality of Service (QoS), and more particularly, to a method and device for controlling QoS of an application.

2. Description of Related Art

With the development of terminal and programming technology, various applications have recently been developed. Because types of services provided by various applications differ from each other, a Quality of Service (QoS) policy is applied to each application in order to provide services smoothly.

However, QoS control policies applied to applications have been determined in consideration of only one traffic type or one flow in the related art, and thus, as the complexity of applications is increased, there is a possibility that the performance of the applications as experienced by users may deteriorate.

Therefore, there is a need for a method of flexibly controlling QoS policies in various applications and communication states while improving the quality of applications experienced by users.

SUMMARY

The disclosure provides a method of flexibly controlling a Quality of Service (QoS) policy of an application.

The disclosure provides a method of flexibly controlling a Quality of Service (QoS) policy of an application according to a type of traffic.

According to an embodiment of the disclosure, a Quality of Service (QoS) policy of an application may be flexibly controlled.

DETAILED DESCRIPTION

Figure 1:
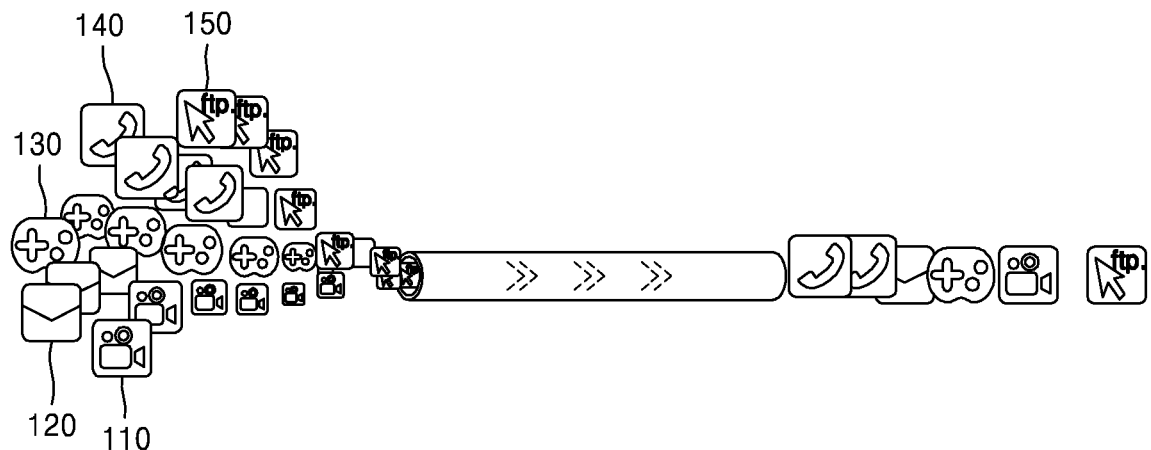
FIG. 1 is a diagram illustrating a Quality of Service (QoS) policy of an application, according to an embodiment.

According to an embodiment, a method of controlling Quality of Service (QoS) of an application includes: determining a main type of traffic of an application; determining a QoS control policy to be applied to each of a plurality of flows generated by execution of the application according to the determined main type of traffic; obtaining performance information about traffic of the application using the traffic transmitted and received through the plurality of flows; and changing a QoS control policy to be applied to at least one of the plurality of flows, based on the obtained performance information about the traffic.

The obtaining of the performance information about the traffic of the application may include obtaining performance information about traffic of each of the plurality of flows, and the changing of the QoS control policy may include selecting a flow to which a QoS control policy is to be changed and then applied, from among the plurality of flows, based on at least one of the obtained performance information about the traffic of the application and the obtained performance information about the traffic of each of the plurality of flows.

The changing of the QoS control policy may include changing the QoS control policy to increase a QoS priority to be applied to the selected flow, and the method may further include, after the QoS control policy is changed, checking whether a change occurs in at least one of performance with respect to the traffic of the application and performance with respect to the traffic of each of the plurality of flows.

The method may further include: based on a result of the checking, determining whether to maintain the changed QoS control policy applied to the selected flow; and storing information about the changed QoS control policy applied to the selected flow.

The method may further include, when the application is re-executed, determining a QoS control policy to be applied to the selected flow based on the stored QoS control policy.

The determining of the main type of traffic of the application may include, when there are a plurality of types of traffic transmitted and received through the flows of the application, determining one of the plurality of types of traffic as a main type of traffic of the application based on at least one of a traffic amount and a frequency of traffic generation (occurrence) for each type of traffic.

The determining of the main type of traffic of the application may include, when there are a plurality of types of traffic transmitted and received through the flows of the application, determining a type of traffic having a highest QoS, from among the plurality of types of traffic, as a main type of traffic of the application.

The determining of the main type of traffic of the application may include determining a main type of traffic of the application after traffic is transmitted and received a certain number of times or for a certain length of time through the flows of the application.

The determining of the main type of traffic of the application may further include: when the traffic amount or the frequency of traffic generation (occurrence) of the application is changed by a certain amount or more, updating the main type of traffic of the application; and storing information about the updated main type of traffic and information about a change time point.

According to an embodiment, provided is a computer-readable recording medium having recorded thereon a program for executing the method on a computer.

According to an embodiment, a method of determining QoS of an application includes: determining whether there are a plurality of types of traffic transmitted and received through a flow generated according to execution of the application; determining a main type of traffic of the flow according to a result of the determining; and determining a QoS control policy to be applied to the flow based on the determined main type of traffic.

The determining of the main type of traffic of the flow may include determining one of the plurality of types of traffic as the main type of traffic based on at least one of a traffic amount and a frequency of traffic generation (occurrence) for each type of traffic transmitted and received through the flow.

The determining of the main type of traffic of the flow may include determining a type of traffic having a highest QoS priority, from among the plurality of types of traffic, as the main type of traffic of the flow.

The method may further include: obtaining performance information about traffic of the flow; and changing the main type of traffic of the flow based on the obtained performance information with respect to the traffic of the flow.

The method may further include storing information about the changed main type of traffic of the flow and information about a change time point.

According to an embodiment, provided is a computer-readable recording medium having recorded thereon a program for executing the method on a computer.

According to an embodiment, a device for controlling QoS of an application includes: a transceiver; and at least one processor, wherein the at least one processor is configured to determine a main type of traffic of the application, determine a QoS control policy to be applied to each of a plurality of flows generated according to execution of the application, based on the determined main type of traffic, obtain performance information about traffic of the application using traffic transmitted and received through the plurality of flows, and change a QoS control policy to be applied to at least one of the plurality flows, based on the obtained performance information about the traffic.

The at least one processor may be further configured to further obtain performance information about traffic of each of the plurality of flows, and select a flow to which changed QoS is to be applied by changing the QoS, from among the plurality of flows, based on at least one of the obtained performance information about the traffic of the application and the obtained performance information about the traffic of each of the plurality of flows.

The at least one processor may be further configured to change the QoS control policy to increase a QoS priority to be applied to the selected flow, and after the QoS control policy is changed, check whether a change occurs in at least one of performance with respect to the traffic of the application and performance with respect to the traffic of each of the plurality of flows.

The device may further include a memory, and the at least one processor may be further configured to determine whether to maintain the changed QoS control policy applied to the selected flow based on a result of the determining, and control the memory to store information about the changed QoS control policy applied to the selected flow.

The at least one processor may be further configured to, when the application is re-executed, determine a QoS control policy to be applied to the selected flow based on the stored QoS control policy.

According to an embodiment, a device for determining a QoS control policy of an application includes: a transceiver; and at least one processor, wherein the at least one processor is configured to determine whether there are a plurality of types of traffic transmitted and received through a flow generated according to execution of the application, determine a main type of traffic of the flow according to a result of the determining, and determine a QoS control policy to be applied to the flow based on the determined main type of traffic.

The at least one processor may be further configured to determine one of the plurality of types of traffic as the main type of traffic based on a traffic amount and a frequency of traffic generation (occurrence) for each type of traffic transmitted and received through the flow.

The at least one processor may be further configured to determine a type of traffic having a highest QoS priority, from among the plurality of types of traffic, as a main type of traffic of the flow.

The at least one processor may be further configured to obtain performance information about traffic of the flow, and change the main type of traffic of the flow based on the obtained performance information about the traffic of the flow.

The device may further include a memory, and the at least one processor may be further configured to control the memory to store information about the changed main type of traffic of the flow and a change time point.

The terms used in the disclosure are selected from among common terms that are currently widely used in consideration of their function in the disclosure. However, the terms may be different according to an intention of one of ordinary skill in the art, precedent, or the advent of new technology. In addition, in particular cases, the terms are discretionally selected by the applicant of the disclosure, and the meaning of those terms will be described in detail in the corresponding parts of the detailed description. Therefore, the terms used in the disclosure are not merely designations of the terms, but the terms are defined based on the meaning of the terms and content throughout the disclosure.

Throughout the specification, when a part is connected to another part, it includes not only the case where the part is directly connected to the other part, but also the case where the part is electrically connected to the other part with another element therebetween. In addition, when a part includes an element, it is to be understood that the part additionally includes other elements rather than excluding other elements as long as there is no particular opposing recitation. Further, the terms described in the specification, such as "-er", "-or", "module", etc., denote a unit processing at least one function or operation, which may be implemented as hardware or software, or a combination thereof.

Throughout the specification, a terminal may include a user equipment (UE). The UE may include a personal computer, a cellular phone, a smartphone, a TV, a tablet, a notebook, a personal digital assistant (PDA), a portable multimedia player (PMP), a navigation, an MP3 player, a digital camera, a black box, a device mounted in a vehicle, a module in the device mounted in the vehicle, and the vehicle itself. However, the disclosure is not limited to the above examples and may include various devices.

Throughout the specification, a network device may include various devices on a network, such as a network interface card, a router, a gateway, a switch, and a hub. However, the disclosure is not limited to the above examples and may include various devices in a network.

Throughout the specification, traffic may refer to transmitted and received data. According to an embodiment, the transmitted and received data may be in the form of a packet. However, the disclosure is not limited to the above example.

Throughout the specification, a flow may refer to a flow of traffic that may be classified or distinguished by a certain criterion. However, the disclosure is not limited to the above example.

Throughout the specification, a main type of traffic of an application may refer to a type of traffic that serves as a reference to determine Quality of Service (QoS) control policy to be applied to the corresponding application, from among a plurality of types of traffic transmitted and received through at least one flow generated by execution of the application. In other words, the main type of traffic of the application may refer to a type of traffic that represents a plurality of types of traffic transmitted and received by execution of the application. However, the disclosure is not limited to the above example.

Throughout the specification, a main type of traffic of a flow may refer to a type of traffic that serves as a reference to determine a QoS control policy to be applied to the corresponding flow, from among a plurality of types of traffic transmitted and received through the flow. In other words, a main type of traffic of a flow may refer to a type of traffic that represents a plurality of types of traffic transmitted and received through the flow. However, the disclosure is not limited to the above example.

Throughout the specification, a QoS control policy may refer to a policy that differentially manages service levels according to importance. For example, the QoS control policy may refer to a policy for determining a priority according to a type of an application, a user, or traffic based on a certain criterion and controlling traffic transmitted and received according to the priority. In addition, the QoS control policy may refer to a policy for determining a QoS requirement and controlling transmitted and received traffic such that the determined QoS requirement is satisfied. However, the disclosure is not limited to the above example, and the QoS control policy may include all policies for differentially managing service levels according to importance.

Throughout the specification, changing of a QoS control policy may refer to changing of a priority of QoS, but is not limited thereto. The changing of the priority of the QoS priority may include increasing, decreasing, or maintaining of the priority of the QoS.

Throughout the specification, performance information about traffic is information about transmitted and received traffic, and may include, for example, at least one of a packet delay, a packet error rate, and a retransmission rate. However, the disclosure is not limited to the above examples, and may include at least one of a traffic amount, a type of traffic, and a frequency of traffic generation (occurrence). In addition, according to an embodiment, performance information about traffic may be obtained and determined for each application or each flow.

FIG. 1 is a diagram illustrating a QoS policy of an application according to an embodiment.

A terminal executes an application based on a user input. Because traffic is transmitted and received by execution of the application, a flow may be generated by execution of each application. According to an embodiment, one or a plurality of flows may be generated according to characteristics of an application.

Referring to FIG. 1, a flow may be generated by execution of an application. For example, a flow 110 of a video application may be generated by execution of the video application, and a flow 120 of an e-mail application may be generated by execution of the e-mail application. When using a game application, a flow 130 of the game application may be generated, and when using a voice over Internet protocol (VoIP) application, a flow 140 of the VoIP application may be generated. In addition, a flow 150 for file transfer such as a file transfer protocol (FTP) may also be generated.

However, because there is a bandwidth limitation in a network, traffic transmitted through flows of all applications may not be transmitted at once. Accordingly, the terminal or the network device determines a QoS priority for a flow of each application. A criterion for determining the QoS priority is called a QoS control policy.

In an existing QoS control policy, the QoS priority has been collectively determined without considering characteristics of the application or the flow. However, because characteristics of the flow of the application are changed in various forms, such as a case where there are a plurality of flows generated by execution of the application, a case where there are a plurality of types of traffic in the flow of the application, or a case where the type of traffic of the flow is changed after the QoS priority of the flow is determined, factors to be considered to control QoS are gradually increasing.

In particular, when the characteristics of the application or the flow are not considered, service quality experienced by a user may be greatly lowered. Therefore, the QoS control policy needs to be applied in consideration of the characteristics of the flow of the application.

Figure 2:
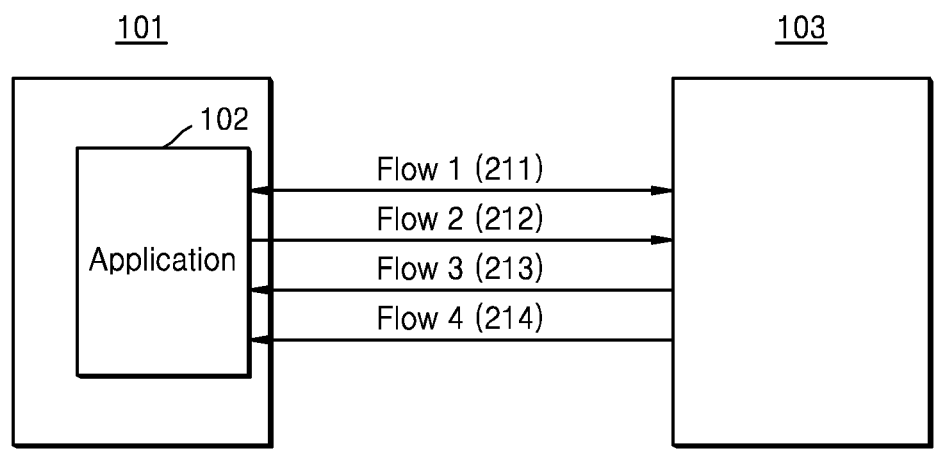
FIG. 2 is a diagram illustrating a flow generated by execution of an application, according to an embodiment.

FIG. 2 is a diagram illustrating a flow generated by execution of an application 102, according to an embodiment.

A terminal 101 may receive a user input and execute an application 102. The application 102 may receive traffic from a network 103. Alternatively, the application 102 may receive traffic from an application server of the network 103. Accordingly, a flow may be generated between the terminal 101 and the network 103. According to an embodiment, a single flow or a plurality of flows may be generated according to characteristics of the application 102.

Referring to FIG. 2, a plurality of flows 211 to 214 are generated by execution of the application 102. According to an embodiment, the flows generated by execution of the application 102 may transmit and receive the same or different traffic. For example, a first flow 211 may transmit and receive traffic about account authentication of an application, a second flow 212 may transmit and receive traffic about video request, a third flow 213 may transmit and receive audio-type traffic, and a fourth flow 214 may transmit and receive video-type traffic.

In addition, according to an embodiment, the traffic about the account authentication of the application transmitted and received through the first flow 211 and the traffic about the video request transmitted and received through the second flow 212 may be web-type or text-type traffic.

In other words, a type of traffic transmitted and received through each of the flows 211 to 214 may be a single type or a plurality of types. In addition, the flows 211 to 214 may transmit and receive traffic of the same type or different types.

According to an embodiment, the terminal 101 or the network 103 may determine a QoS priority for each of the flows 211 to 214, or may determine the QoS priority based on the application 102.

In addition, according to an embodiment, the terminal 101 or the network 103 may apply respective QoS control policies to the flows 211 to 214. However, the QoS control policy may be applied to each application, and is not limited to the above example.

However, data processed in the application 102 is transmitted and received through the flows 211 to 214, and thus, when performance with respect to traffic of one of the flows 211 to 214 is degraded, service quality of the application 102 may be lowered. Accordingly, the terminal 101 or a device within the network 103 may determine the QoS priority in consideration of a relationship among the flows 211 to 214 of the application 102.

Figures 3, 4:
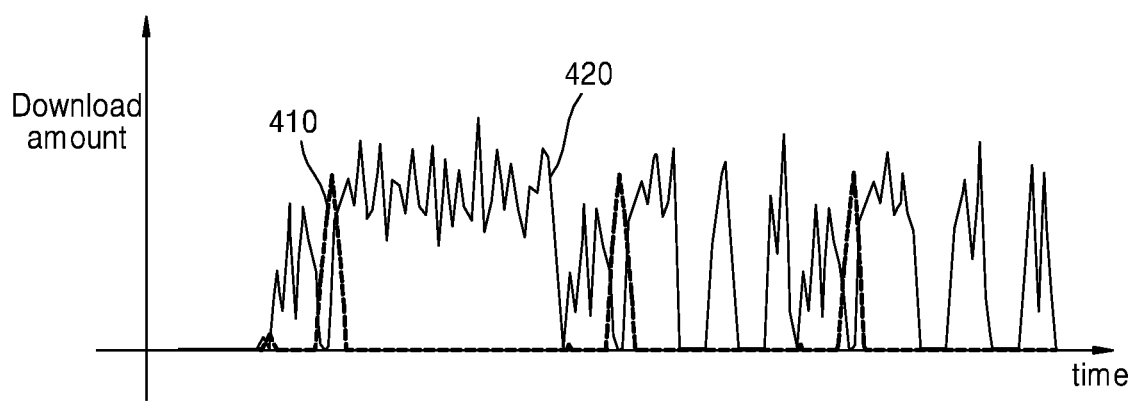
FIG. 3 is a diagram illustrating a structure of traffic of an application, according to an embodiment.
FIG. 4 is a diagram illustrating a plurality of flows generated by execution of an application, according to an embodiment.

FIG. 3 is a diagram illustrating a structure of traffic of an application, according to an embodiment.

As described above, traffic is data, and may refer to transmitted and received data. According to an embodiment, the transmitted and received data may be in the form of a packet 301. The packet 301 illustrated in FIG. 3 is an example of a transmission control protocol/internet protocol (TCP/IP) packet.

According to an embodiment, a QoS control device may identify a flow by classifying traffic generated by generation of an application. For example, the QoS control device may identify the flow based on protocol identification information 310, source address information 320, destination address information 330, source port information 340, and destination port information 350 in a header of the packet 301. However, the QoS control device is not limited to the above examples, and the QoS control device may distinguish the flow based on various pieces of information in the packet 301.

According to an embodiment, a Sequence Number field may include information about an order of transmitted and received data, an Acknowledgement Number field may include information about a next number expected to be received, a Checksum field may include information for detecting a data error, and an Urgent Pointer field may include information about a location of emergency data included in the packet 301. Remaining fields are obvious based on their field names, and a structure of the TCP/IP packet is apparent to one of ordinary skill in the art, and thus, a detailed description thereof will be omitted.

FIG. 4 is a diagram illustrating a plurality of flows generated by execution of an application, according to an embodiment.

FIG. 4 illustrates an amount of download traffic of a flow generated by execution of the application. According to an embodiment, a download may refer to a communication direction in which the terminal receives from the network.

Referring to FIG. 4, traffic may be continuously downloaded through a first flow 410, and traffic may be intermittently downloaded through a second flow 420. In other words, all flows may transmit and receive traffic at different frequencies.

In addition, according to an embodiment, the first flow 410 may transmit and receive text, audio, and video-type traffic, and the second flow 420 may transmit and receive text-type traffic.

According to an embodiment, because the first flow 410 transmits and receives traffic at a higher frequency and transmit and receive traffic with a higher priority, such as audio and video-type traffic, the QoS control device may apply a higher QoS priority to the first flow 410 and may apply a lower QoS priority to the second flow 420 intermittently transmitting and receiving only text-type traffic. The QoS control device may apply a QoS control policy to each flow according to priority.

However, although the first flow 410 is applied with a higher QoS priority, when processing of traffic in the application is delayed due to a lower QoS priority of the second flow 420, the overall performance of service provision of the application may be lowered. Accordingly, when the QoS control policy is applied simply by considering only the frequency of traffic generation (occurrence) or the type of traffic of the flow, service quality of the application experienced by the user may be lowered. Therefore, The QoS control device may apply a QoS control policy in consideration of performance with respect to traffic of the first flow 410 and the second flow 420. This will be described in more detail with reference to FIG. 5.

Figure 5:
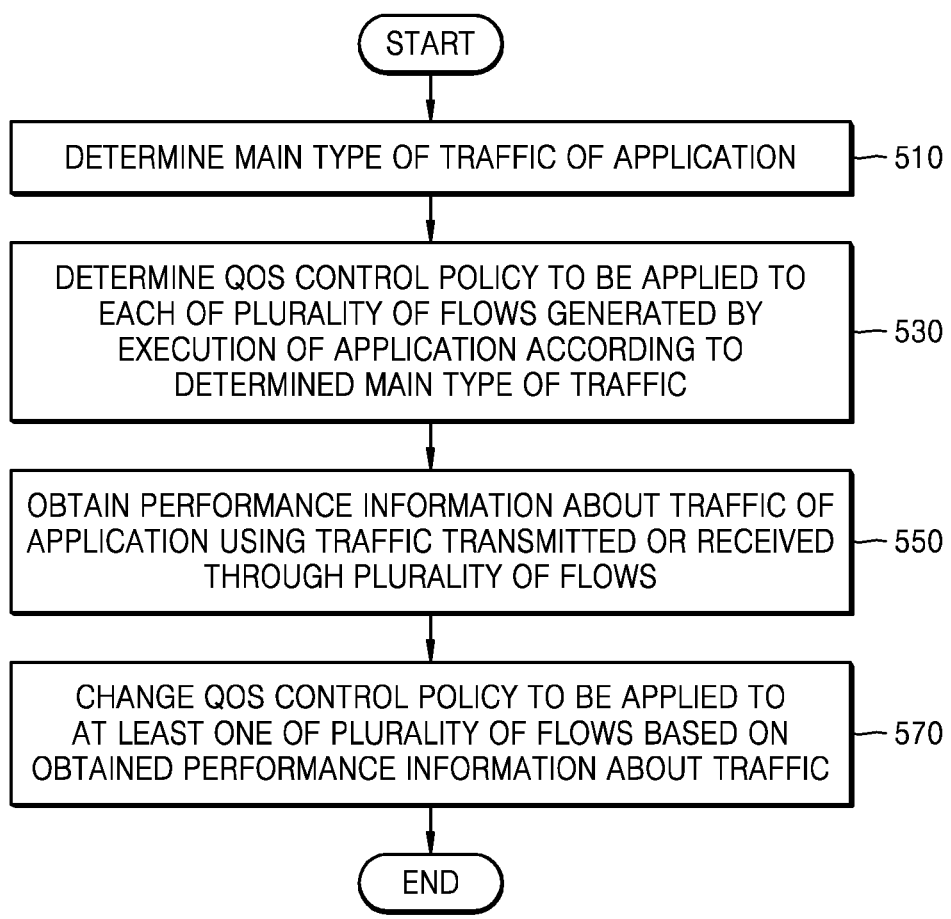
FIG. 5 is a flowchart illustrating a method of controlling QoS of an application, according to an embodiment.

FIG. 5 is a flowchart illustrating a method of controlling QoS of an application, according to an embodiment.

In operation 510, the QoS control device may determine a main type of traffic of an application.

According to an embodiment, the QoS control device may determine the main type of traffic of the application, and may determine a main type of traffic of each of a plurality of flows generated by execution of the application.

According to an embodiment, the QoS control device may independently determine the main type of traffic for each of the flows, or may determine that all flows generated by execution of the same application have the same main type of traffic.

In addition, according to an embodiment, the QoS control device may determine the main type of traffic of the application by using various methods. For example, when there are a plurality of types of traffic transmitted and received through the flow of the application, the QoS control device may determine one of the types of traffic as a main type of traffic of the application based on at least one of a traffic amount and a frequency of traffic generation (occurrence) for each type of traffic.

In addition, according to an embodiment, when there are a plurality of types of traffic transmitted and received through the flow of the application, the QoS control device may determine a type of traffic having a highest QoS (a highest QoS priority?), from among the types of traffic, as a main type of traffic of the application.

Further, according to the an embodiment, because the frequency of traffic generation (occurrence) of the application continuously changes, the QoS control device may determine a type of traffic of the application at a certain time point. For example, the QoS control device may determine the main type of traffic of the application after traffic is transmitted and received a certain number of times or for a certain time.

In addition, according to an embodiment, because the type of traffic transmitted and received through the flow of the application continuously changes, the QoS control device may change the predetermined type of traffic of the application. In other words, the QoS control device may update information about the type of traffic of the application. For example, the QoS control device may update the main type of traffic of the application when at least one of a traffic amount or a frequency of traffic generation (occurrence) of the application is changed by a certain amount or more.

In addition, the methods of determining or updating the main type of traffic of the application described above may also be used when determining a main type of traffic of at least one flow generated by execution of the application.

Additionally, according to an embodiment, the QoS control device may store a main type of traffic of each application. In addition, the QoS control device may store information about main types of traffic of a plurality of flows generated by execution of the application. Further, the QoS control device may store information about a time point when the main type of traffic of the application is determined and a time point when information about the main type of traffic is updated, and may also store information about a time point when main types of traffic of a plurality of flows generated by execution of the application are determined and a time point when information about the main types of traffic is updated.

In operation 530, the QoS control device may determine a QoS control policy to be applied to each of a plurality of flows generated by execution of the application according to the determined main type of traffic.

According to an embodiment, the QoS control policy may further include information about guaranteeing a delay, an error rate, a retransmission rate, and a transmission rate to be observed according to a QoS priority, but is not limited to the above example. In addition, the QoS control policy may be applied to each flow.

Further, according to an embodiment, when a stored QoS control policy exists, the QoS control device may re-execute or update the application and then apply the stored QoS control policy. In other words, when an existing QoS control policy is changed and then stored, the QoS control device may apply the changed QoS control policy when the application is re-executed.

In operation 550, the QoS control device may obtain performance information about traffic of the application using the traffic transmitted and received through the flows.

In other words, the QoS control device may detect a change in performance with respect to the traffic of the application using the traffic transmitted and received through the flows.

As described above, the performance with respect to the traffic may include at least one of a packet delay, a packet error rate, and a retransmission rate. However, the performance with respect to the traffic is not limited to the above example, and may include all information related to the traffic for measuring the performance.

According to an embodiment, the QoS control device may monitor at least one of the packet delay, the packet error rate, and the retransmission rate of the application. The QoS control device may monitor at least one of a packet delay, a packet error rate, and a retransmission rate for each flow of the application. The QoS control device may obtain performance information about the traffic of the application or may detect a change in the performance through monitoring.

According to an embodiment, the QoS control device may estimate the service quality experienced by obtaining the performance information about the traffic of the application. For example, the QoS control device may estimate whether buffering occurs more than a certain number of times, whether a resolution is degraded to a threshold or less, and the like by monitoring at least one of the packet delay, the packet error rate, and the retransmission rate.

In operation 570, the QoS control device may change a QoS control policy to be applied to at least one of the flows based on the obtained performance information about the traffic.

According to an embodiment, the changing of the QoS control policy may mean changing of the QoS priority. According to an embodiment, the QoS control device may increase the QoS priority when the performance with respect to the traffic of the application is degraded. For example, the QoS control device may increase a QoS priority of a flow having a lowest QoS priority from among the flows of the application.

In addition, according to an embodiment, the QoS control device may obtain performance information about traffic of each flow and increase a QoS priority of a flow having lowest performance with respect to traffic. For example, the QoS control device may increase a QoS priority of a flow having a highest transmission rate.

In addition, according to an embodiment, the QoS control device may select a flow to which a changed QoS control policy is to be applied by changing the QoS control policy, from among the flows, based on at least one of performance information about traffic of each flow and performance information about traffic of the application.

According to an embodiment, the QoS control device may store the changed QoS control policy. That is, the QoS control device may store information about the changed QoS priority applied to each flow.

In addition, according to an embodiment, the QoS control device may change a QoS control policy that has been already applied to at least one of the flows based on the obtained performance information about the traffic.

Figure 6:
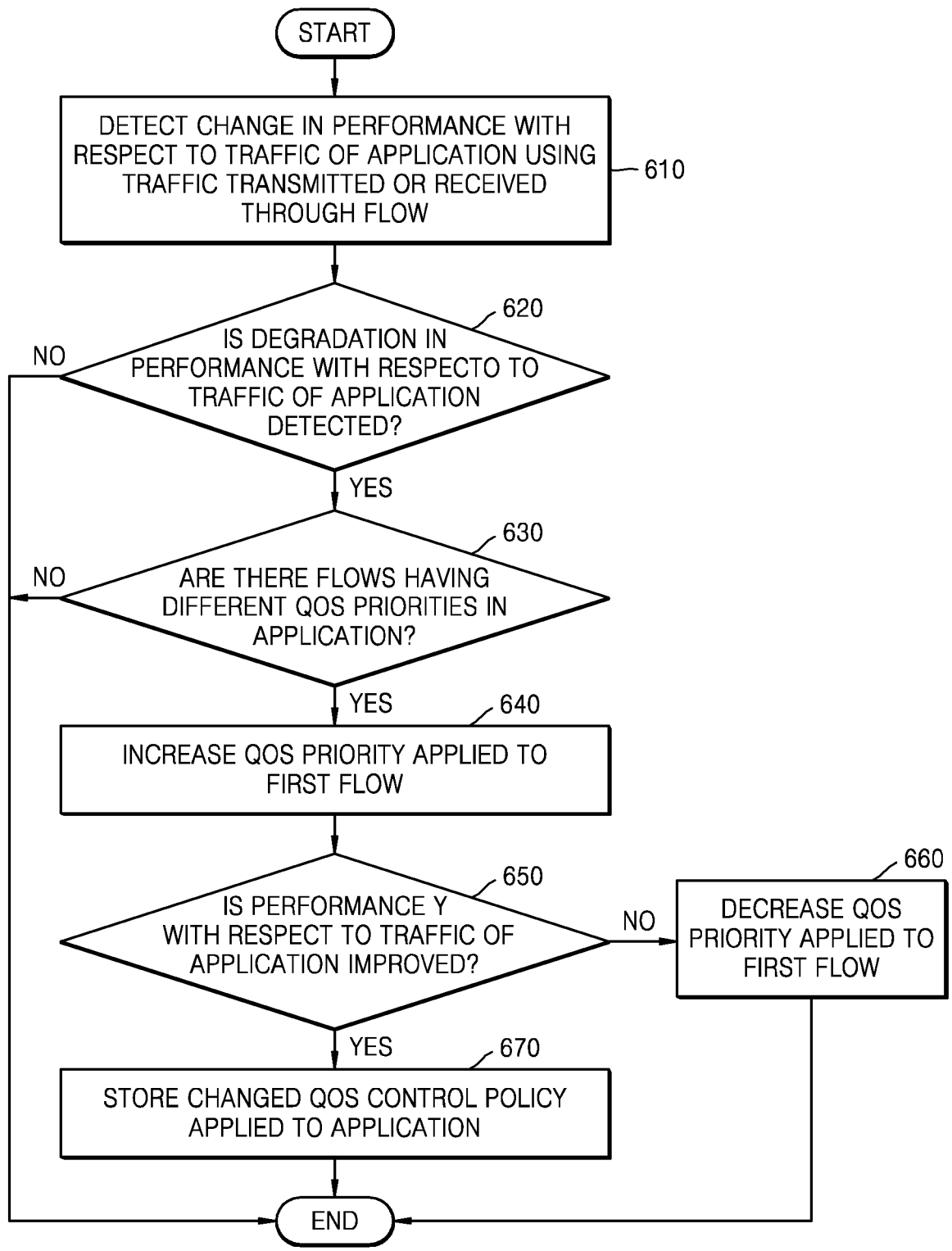
FIG. 6 is a detailed flowchart of a method of controlling QoS of an application, according to an embodiment.

FIG. 6 is a detailed flowchart of a method of controlling QoS of an application, according to an embodiment.

In operation 610, the QoS control device may detect a change in performance with respect to traffic of an application using the traffic transmitted and received through a flow. As described above, the QoS control device may detect the change in the performance with respect to the traffic of the application by obtaining performance information about the traffic of the application. This corresponds to the description of FIG. 5, and thus, a detailed description thereof will be omitted.

In operation 620, the QoS control device may detect whether the performance with respect to the traffic of the application is degraded.

According to an embodiment, the QoS control device may monitor at least one of a packet delay, a packet error rate, and a retransmission rate of the application. For example, the QoS control device may detect whether performance with respect to traffic of all of at least one flow generated according to execution of the application is degraded.

In addition, according to an embodiment, the QoS control device may detect whether performance with respect to traffic of each of the at least one flow generated by execution of the application is degraded. For example, the QoS control device may determine whether at least one of a packet delay, a packet error rate, and a retransmission rate of at least one of the flows of the application is increased. That is, the QoS control device may obtain performance information about traffic for each flow and may obtain performance information about traffic for each application.

In addition, according to an embodiment, the QoS control device may measure a network state. For example, the QoS control device may measure channel quality based on a data rate, a packet error rate, and retransmission rate of a terminal or a network device, and may receive information about the channel quality from an external device.

According to an embodiment, the QoS control device may measure at least one of the network state, performance with respect to traffic of the application, and performance with respect to traffic of each of the flows, and in a case where the performance with respect to the traffic of the application is degraded, may determine whether the performance with respect to the traffic of the application is degraded due to the network state, or whether the performance with respect to the traffic of the application is degraded even though the network state is good.

In operation 630, the QoS control device may determine whether flows having different QoS priorities exist in the application.

According to an embodiment, a plurality of flows may be generated by execution of the application, and flows may have different QoS priorities. Accordingly, the QoS control device may determine whether flows having different QoS priorities exist.

In operation 640, the QoS control device may increase a QoS priority applied to a first flow.

According to an embodiment, the first flow may be a flow having a lowest QoS priority from among the flows generated by execution of the application. In addition, according to an embodiment, the first flow may be a flow having a lowest performance with respect to traffic from among the flows generated by execution of the application.

In other words, the QoS control device may obtain performance information about traffic of each of the flows, select, as a first flow, a flow to which a changed QoS control policy is applied by changing the QoS control policy, from among the flows based on the obtained performance information with respect to the traffic, and select, as a first flow, a flow to which the lowest QoS priority is applied. The QoS control device may increase a QoS priority of the selected flow.

In operation 650, the QoS control device may determine whether the performance with respect to the traffic of the application is improved.

According to an embodiment, the QoS control device may determine whether the QoS priority of the selected flow is increased in operation 640 and whether the performance with respect to the traffic of the application is improved.

According to an embodiment, the QoS control device may determine whether the performance with respect to the traffic of the application is improved, or may determine whether performance with respect to traffic of at least one of the flows generated by execution of the application is improved.

For example, after changing the QoS priority of at least one flow, the QoS control device may determine whether at least one of a packet delay, a packet error rate, and a retransmission rate of the application or the at least one flow is reduced. In other words, according to an embodiment, the QoS control device may estimate whether service quality of the application experienced, such as buffering and resolution, is also improved by determining whether performance with respect to traffic of the application or the at least one flow is improved.

When the performance with respect to the traffic of the application is not improved, in operation 660, the QoS control device may decrease the QoS priority applied to the first flow.

According to an embodiment, the QoS control device may restore the changed QoS priority applied to the first flow to a previous state before the change. However, the disclosure is not limited to the above example. In addition, according to an embodiment, the QoS control device may store a change history of the QoS priority applied to the first flow.

When the performance with respect to the traffic of the application is improved, in operation 670, the QoS control device may store a changed QoS control policy applied to the application.

According to an embodiment, when it is determined that the performance with respect to the traffic of the application is improved through monitoring, the QoS control device may maintain the changed QoS control policy.

In addition, according to an embodiment, in order to apply the QoS control policy after re-execution or update of the application in the future, the QoS control policy may store information about the changed QoS control policy.

According to an embodiment, the information about the QoS control policy may include information about a name of the application, a type of the application, a number of flows of the application, a type of traffic of the flows of the application, QoS priorities of the flows of the application, information about a network state, and the like, but is not limited to the above example.

Figure 7:
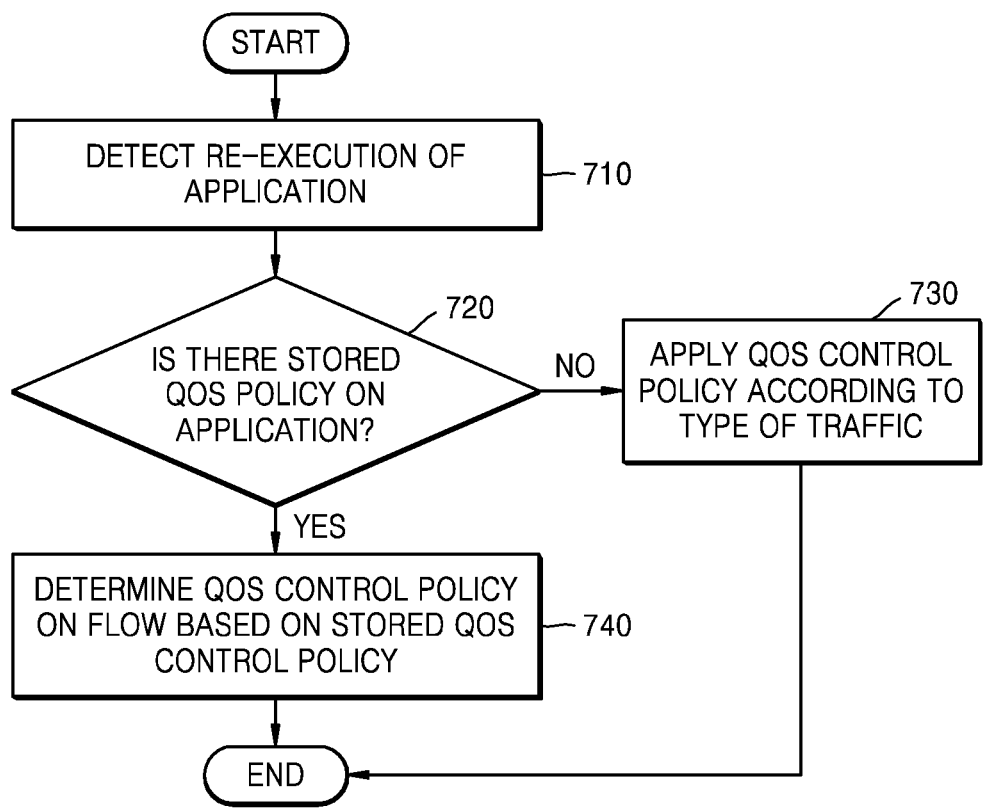
FIG. 7 is a detailed flowchart of a method of controlling QoS when an application is re-executed, according to an embodiment.

FIG. 7 is a detailed flowchart of a method of controlling QoS when an application is re-executed, according to an embodiment.

In operation 710, the QoS control device may detect re-execution of an application. In other words, after the application is terminated, the application may be re-executed according to a user input.

In operation 720, the QoS control device may determine whether a stored QoS policy on the application exists.

For example, the QoS control device may determine whether a QoS control policy changed according to characteristics of the application exists as illustrated in FIG. 6. For example, the QoS control device may determine whether a QoS priority to be applied to each of a plurality of flows generated according to execution of the application exists.

In addition, according to an embodiment, the QoS control device may apply a most recently changed QoS priority to each flow by checking a change history of QoS priorities of the flows of the application.

When the stored QoS control policy does not exist, in operation 730, the QoS control device may apply the QoS control policy according to a type of traffic.

According to an embodiment, the QoS control device may determine a main type of traffic of the application and may apply the QoS control policy according to the determined main type of traffic. However, the disclosure is not limited to the above example, and a QoS control policy determined based on a QoS policy obtained from a network operator, a requirement of an application developer, or the like may be used.

However, when a QoS policy (e.g., a QoS policy obtained from a network operator, etc.) that is being applied in a given network environment is used, and consequently, the performance with respect to traffic of the application is degraded, the QoS control policy may be changed based on the characteristics of the application and the network state according to the method described above.

When the stored QoS control policy exists, in operation 740, the QoS control device may determine a QoS control policy on the flow based on the stored QoS control policy.

In other words, when the application is re-executed, a QoS control policy changed before the application is terminated may be re-applied. Therefore, when a QoS control policy that is changed and then stored exists, the QoS control device may preferentially apply the QoS control policy.

In addition, according to an embodiment, whenever the application is updated or when the application is newly installed and executed, the QoS control device may execute the methods described with reference to FIGS. 5 and 6 in order to apply the QoS control policy according to characteristics of each application.

Further, according to an embodiment, the QoS control device may execute the methods described with reference to FIGS. 5 and 6 in order to apply the QoS control policy according to the characteristics of the application even when a network situation is changed by a certain amount or more. For example, the QoS control device may execute the methods described with reference to FIGS. 5 and 6 to change the QoS control policy, when a data rate is changed by a certain range or more, a communication bandwidth is changed by a certain size or more in a scheme such as carrier aggregation (CA), or a communication environment is changed, such as a change in the traffic transmission and reception speed by a certain frequency or more due to a change of a frequency bandwidth.

Also, according to an embodiment, whenever the QoS control policy is changed, the QoS control device may store information about the changed QoS policy and information about a change time point and a network state at the time of the change. In other words, when the QoS control policy is updated, the QoS control device may also update information about the stored QoS control policy.

Figure 8:
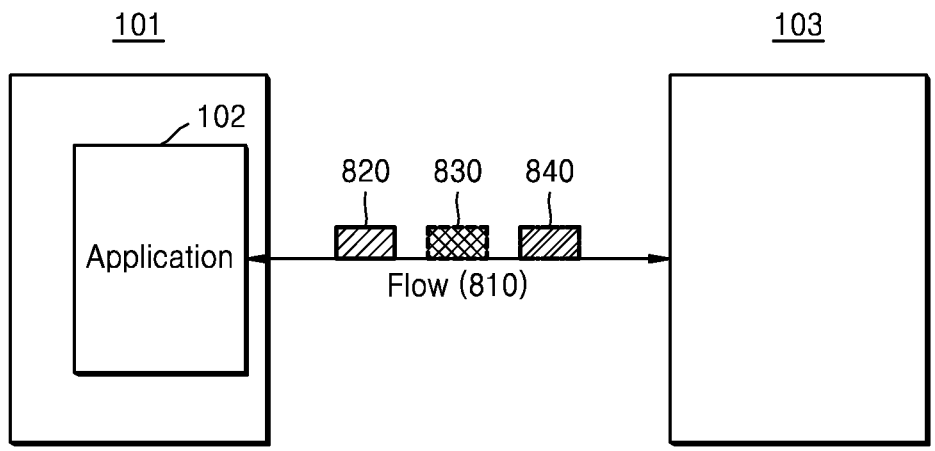
FIG. 8 is a diagram for describing a type of traffic transmitted and received through a flow, according to an embodiment.

FIG. 8 is a diagram for describing a type of traffic of a flow 810 according to an embodiment.

A terminal 101 may receive a user input and execute an application 102. Because the application 102 receives traffic from the network 103, a flow may be generated by execution of the application 102. Referring to FIG. 8, a plurality of types of traffic may be transmitted and received through a single flow 810.

For example, the flow 810 may transmit and receive video-type traffic 820, audio type-traffic 830, and text-type traffic 840. Besides the video-type traffic 820, the audio-type traffic 830, and the text-type traffic 840, the types of traffic may include image-type traffic, but are not limited to the above examples.

According to an embodiment, a QoS control device of the terminal 101 or the network 103 may determine a QoS control policy based on the type of traffic of the flow 810. However, in the existing case, when a plurality of types of traffic are transmitted through the flow 810, the QoS control policy is determined by considering only one traffic type, and thus, there is a possibility that service performance experienced is reduced.

Accordingly, when a plurality of types of traffic are transmitted and received through a single flow 810, a QoS priority may be controlled by considering all of the types of traffic. Hereinafter, a method of determining a QoS control policy when a plurality of types of traffic are transmitted and received will be described.

In addition, the following description may be used to determine the type of traffic of each flow described with reference to FIGS. 4 to 6.

Figure 9:
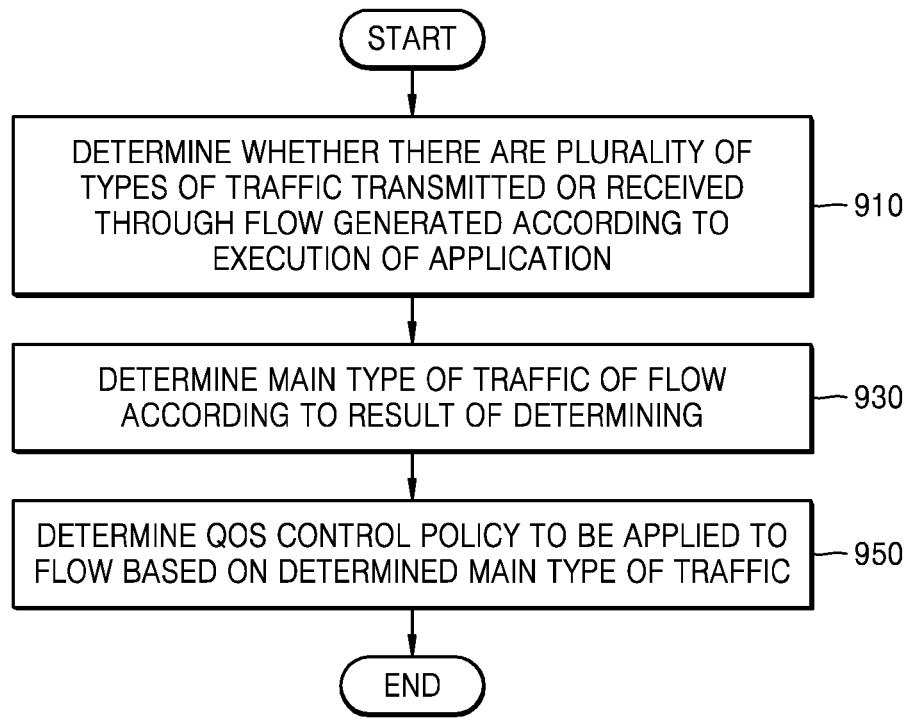
FIG. 9 is a flowchart illustrating a method of determining a QoS control policy of an application based on a type of traffic, according to an embodiment.

FIG. 9 is a flowchart illustrating a method of determining a QoS control policy of an application based on a type of traffic, according to an embodiment.

In operation 910, the QoS control device may determine whether there are a plurality of types of traffic transmitted and received through a flow generated according to execution of an application.

According to an embodiment, the QoS control device may determine which type of traffic is transmitted and received through the flow by detecting types of traffic transmitted and received through the flow for a certain period.

According to an embodiment, the QoS control device may determine which type of traffic is transmitted and received through the flow by detecting types of traffic transmitted and received through the flow for a certain number of times. However, the disclosure is not limited to the above examples, and the QoS control device may detect types of traffic of the flow by using various methods.

In addition, according to an embodiment, the QoS control device may store information about the types of traffic of the flow. Additionally, the QoS control device may update the type of traffic when an amount, frequency, or type of traffic through the flow is changed by a certain amount or more, and may store information about the updated type of traffic and information about a change time point.

In operation 930, the QoS control device may determine a main type of traffic of the flow according to a result of the determining.

According to an embodiment, when there are a plurality of types of traffic transmitted and received through the flow, the QoS control device may select one of a plurality of types of traffic as a main type of traffic of the flow based on a traffic amount and a frequency of traffic generation (occurrence) for each type of traffic.

In addition, according to an embodiment, when there are a plurality of types of traffic transmitted and received through the flow, the QoS control device may select a type of traffic having a highest QoS priority, from among the types of transmitted and received traffic, as a main type of traffic of the flow. When there are a plurality of flows, the QoS control device may select a main type of traffic of each flow according to the method described above.

In operation 950, the QoS control device may determine a QoS control policy to be applied to the flow based on the determined main type of traffic.

According to an embodiment, the QoS control device may determine and apply a QoS control policy to be applied to the main type of traffic of the flow determined in operation 930. In addition, when the main type of traffic is changed, the QoS control device may change the QoS control policy according to the changed main type of traffic and may apply the changed QoS control policy.

Figure 10:
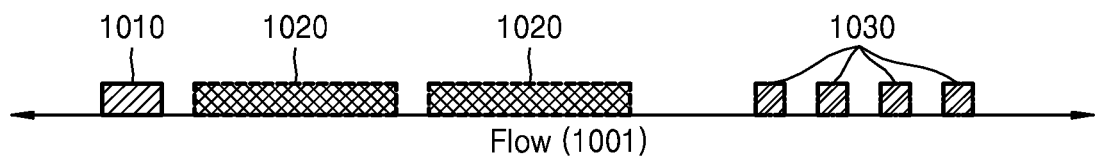
FIG. 10 is a diagram for describing a method of determining a main type of traffic, according to an embodiment.

FIG. 10 is a diagram for describing a method of determining a main type of traffic, according to an embodiment.

Referring to FIG. 10, a first traffic type 1010, a second traffic type 1020, and a third traffic type 1030 transmitted and received through a flow 1001 of FIG. 10 may be an audio, video, and text type, respectively.

According to an embodiment, the QoS control device may determine a main type of traffic of a flow based on a frequency of traffic generation (occurrence) for each type of traffic. According to an embodiment, because text which is the third traffic type 1030 has a highest frequency of traffic generation (occurrence) for each type of traffic in FIG. 10, the QoS control device may determine the main type of traffic of the flow 1001 of FIG. 10 as a text type.

According to an embodiment, the QoS control device may determine the main type of traffic of the flow based on a traffic amount for each type of traffic. According to an embodiment, because audio which is the second traffic type 1020 has a highest traffic amount for each type of traffic, the QoS control device may determine the main type of traffic of the flow 1001 of FIG. 10 as an audio type According to an embodiment, the QoS control device may determine, as the main type of traffic of the flow, a type of traffic having a highest QoS priority from among a plurality of types of traffic. When it is assumed that video-type traffic has a highest QoS priority, the QoS control device may determine the main type of traffic of the flow 1001 of FIG. 1 as a video type In addition, according to an embodiment, the QoS control device may determine the main type of traffic in consideration of patterns of types of transmitted and received traffic and may change the main type of traffic at a certain interval. The QoS control device may change the applied QoS control policy by changing the main type of traffic.

In addition, according to an embodiment, after determining the main type of traffic, the QoS control device may change the main type of traffic of the flow by detecting a change in performance with respect to the traffic of the flow. This will be described in detail with reference to FIG. 11.

Figure 11:
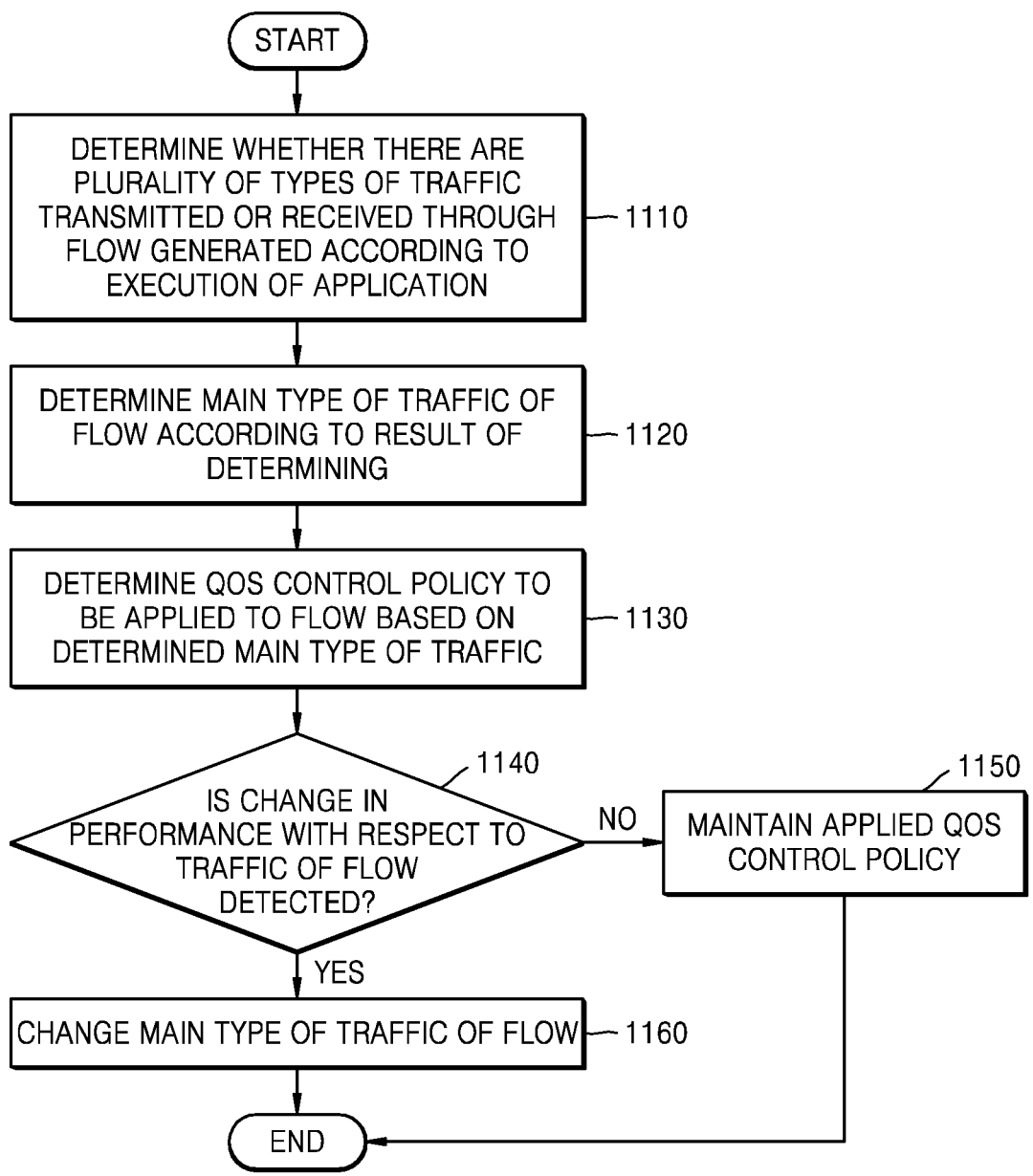
FIG. 11 is a detailed flowchart illustrating a method of determining a QoS control policy of an application based on a type of traffic, according to an embodiment.

FIG. 11 is a detailed flowchart illustrating a method of determining a QoS control policy of an application based on a type of traffic, according to an embodiment.

In operation 1110, the QoS control device may determine whether there are a plurality of types of traffic transmitted and received through a flow generated according to execution of an application.

In operation 1120, the QoS control device may determine a main type of traffic of the flow according to a result of the determining.

In operation 1130, the QoS control device may determine a QoS control policy to be applied to the flow based on the determined main type of traffic. Because operations 1110 through 1130 correspond to the operations described above, a detailed description thereof will be omitted.

In operation 1140, the QoS control device may determine whether a change in performance with respect to traffic of the flow is detected.

According to an embodiment, the QoS control device may obtain performance information about the traffic of the flow. The QoS control device may detect a change in the performance based on the performance information about the traffic of the flow.

According to an embodiment, the QoS control device may detect a change in performance with respect to the traffic of the flow by measuring at least one of a packet error rate, a packet delay rate, and a retransmission rate of the flow. For example, the QoS control device may determine whether performance with respect to the traffic of the flow is degraded by measuring at least one of the packet error, the packet delay rate, and the retransmission rate.

According to an embodiment, the QoS control device may measure at least one of a packet error rate, a packet delay rate, and a retransmission rate for each type of traffic of the flow. In other words, the QoS control device may measure at least one of a packet error rate, a packet delay rate, and a retransmission rate of the entire flow, or may measure at least one of a packet error rate, a packet delay rate, and a retransmission rate for each type of traffic in the flow.

According to an embodiment, when there is no change in the performance with respect to the traffic, in operation 1150, the QoS control device may maintain the applied QoS control policy. According to an embodiment, the QoS control device may maintain the applied QoS control policy even when the performance with respect to the traffic of the flow is increased.

According to an embodiment, when a change in the performance with respect to the traffic occurs, in operation 1160, the QoS control device may change a main type of traffic of a data flow.

According to an embodiment, the QoS control device may determine whether the performance with respect to the traffic of the flow is degraded. When the performance with respect to the traffic of the flow is degraded, the QoS control device may change the main type of traffic determined in operation 1120.

According to an embodiment, the QoS control device may change a QoS control policy applied to the flow by changing the main type of traffic of the flow. In other words, the QoS control device may change a QoS priority of the flow.

Figure 12:
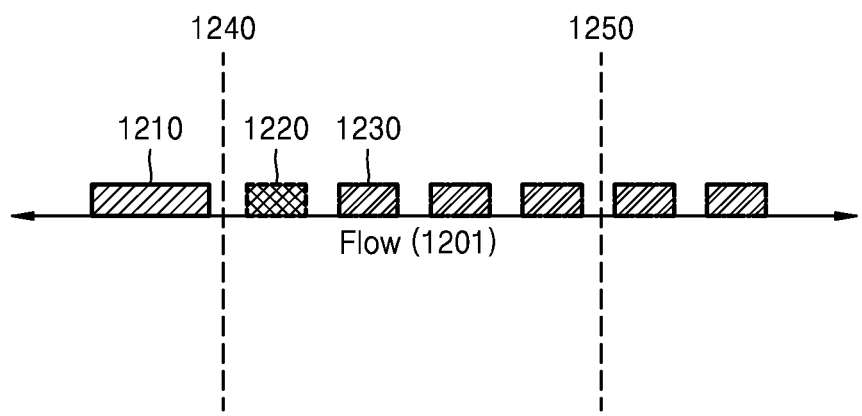
FIG. 12 is a diagram for describing a time point when a main type of traffic is determined, according to an embodiment.

FIG. 12 is a diagram for describing a time point when a main type of traffic is determined, according to an embodiment.

According to an embodiment, a type of traffic of a flow 1201 may vary according to a time point when a main type of traffic of the flow 1201 is determined. Referring to FIG. 12, video-type traffic 1210, audio-type traffic 1220, and text-type traffic 1230 may be transmitted and received through the flow 1201.

According to an embodiment, when the QoS control device determines a main type of traffic based on a frequency of traffic generation (occurrence) for each type of traffic, the QoS control device at a first determination time point 1240 may determine the video-type traffic 1210 as the main type of traffic of the flow 1201. However, the QoS control device at a second determination time point 1250 may determine the text-type traffic 1230 as the main type of traffic of the flow 1201.

In other words, the main type of traffic of the flow 1201 may be determined differently according to a time point when the main type of traffic of the QoS control device is determined. Accordingly, the QoS control device may determine the main type of traffic of the flow 1201 in consideration of types of traffic transmitted and received for a certain time or a certain number of times in order to efficiently determine the main type of traffic.

In addition, the QoS control device may store a determination time point at which the main type of traffic is determined to reduce a burden of continuously monitoring, and may determine the main type of traffic of the flow 1201 based on the stored determination time point at the time of update and re-execution of the application in the future.

Figure 13:
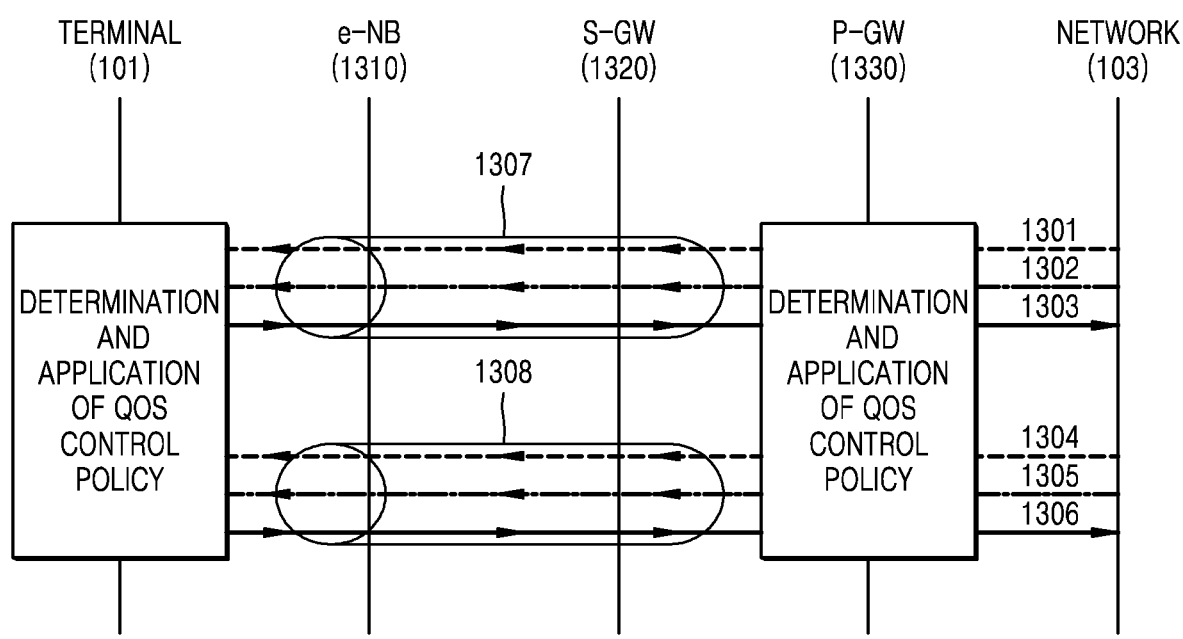
FIG. 13 is a diagram for describing a system in which traffic is transmitted and received between a terminal and a network, according to an embodiment.

FIG. 13 is a diagram for describing a system in which traffic is transmitted and received between a terminal 101 and a network 103, according to an embodiment.

FIG. 13 illustrates a system in which traffic is transmitted and received between the terminal 101 and the network 103. As described above, traffic may be transmitted and received through a plurality of flows 1301 to 1303.

According to an embodiment, a network system of FIG. 13 may be a network reference model (NRM) of a long-term evolution (LTE). An e-NB 1301 is a base station and may be described in various forms such as a Node-B, an eNB, and the like. An S-GW 1320 may refer to a serving gateway, and a P-GW 1330 may refer to a packet data network (PDN) gateway. Roles and operations of the entities are apparent to one of ordinary skill in the art, and thus, a detailed description thereof will be omitted.

According to embodiments, the QoS control device that determines and applies the QoS control policy may be included in the terminal 101 or P-GW 1330. According to an embodiment, the P-GW 1330 may be a network device. As described above, the network device may include various devices on a network such as a network interface card, a router, a gateway, a switch, and a hub, but is not limited to the above examples.

According to an embodiment, a plurality of flows 1301 to 1306 may be generated by execution of an application on the terminal 101, and the flows 1301 to 1306 may be transferred between the network 103 and the terminal 101 through bearers 1307 and 1308. As the terminal 101 or the P-GW 1330 is applied with the QoS control policy, the flows 1301 to 1306 may be transmitted and received through an appropriate bearer 1307 or 1308 from among the bearers 1307 and 1308.

However, a network model illustrated in FIG. 13 is merely an example, and a QoS control method of the disclosure may be applied to other network models.

Figure 14:
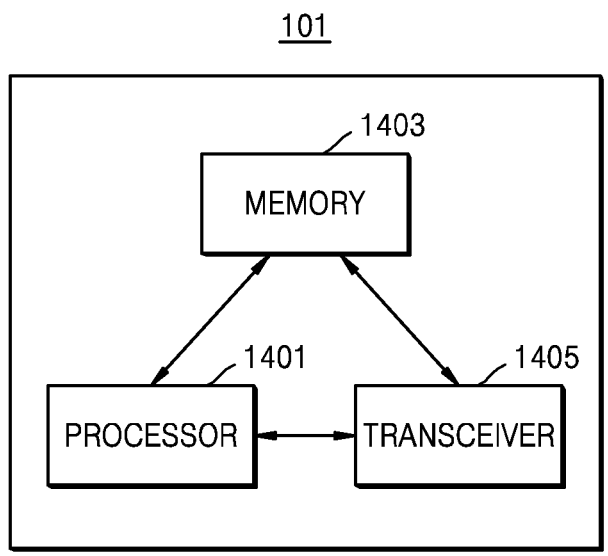
FIG. 14 is a block diagram of a user terminal for controlling QoS of an application, according to an embodiment.

FIG. 14 is a block diagram of a terminal 101 for controlling QoS of an application, according to an embodiment. According to an embodiment, the QoS control device may be the terminal 101. The QoS control device may be the terminal 101 itself or a part of the terminal 101.

As illustrated in FIG. 14, the terminal 101 for controlling QoS according to an embodiment may include a processor 1401, a memory 1403, and a transceiver 1405. However, all the elements illustrated in FIG. 14 are not essential elements of the terminal 101. The terminal 101 may be implemented with more elements than the elements illustrated in FIG. 14 or may be implemented with fewer elements than the elements illustrated in FIG. 14. In addition, the processor 1401, the memory 1403, and the transceiver 1405 of the terminal 101 may be implemented in the form of a single chip.

According to an embodiment, the processor 1401 generally controls the overall operation of the terminal 101. For example, the processor 1401 may be configured to execute a program stored in the terminal 101 to generally control elements included in the terminal 101. In addition, the processor 1401 may be provided as at least one processor.

According to an embodiment, the processor 1401 may be configured to determine a main type of traffic of an application, determine a QoS control policy to be applied to each of a plurality of flows generated by execution of the application according to the determined main type of traffic, obtain performance information about traffic of the application using the traffic transmitted and received through the flows, and change a QoS control policy to be applied to at least one of the flows based on the obtained performance information about the traffic of the application.

In addition, according to an embodiment, the processor 1401 may be configured to determine whether there are a plurality of types of traffic transmitted and received through a flow generated according to execution of the application, determine a main type of traffic of the flow according to a result of the determining, and determine a QoS control policy to be applied to the flow based on the determined main type of traffic.

According to an embodiment, the processor 1401 may be configured to further obtain performance information about traffic of each of the flows, and select a flow to which a changed QoS control policy is to be applied by changing the QoS control policy, from among the flows based on at least one of the obtained performance information about the traffic of the application and the obtained performance information with respect to each of the flows.

According to an embodiment, the processor 1401 may be configured to change the QoS control policy to increase a QoS priority to be applied to a selected first flow, and after the QoS control policy is changed, check whether a change occurs in at least one of performance with respect to the traffic of the application and performance with respect to the traffic of each of the flows.

According to an embodiment, the processor 1401 may be configured to, when the application is re-executed, determine a QoS control policy to be applied to the flow based on a stored changed QoS control policy.

According to an embodiment, the processor 1401 may be configured to determine a QoS policy to be applied to a plurality of flows generated by execution of another application having the same flow structure as the application, based on a pre-stored changed QoS policy.

According to an embodiment, the processor 1401 may be configured to determine one of a plurality of types of traffic as a main type of traffic based on a traffic amount and a frequency of traffic generation (occurrence) for each type of traffic transmitted and received through the flow.

According an embodiment, the processor 1401 may be configured to determine a type of traffic having a highest QoS priority, from among the types of traffic, as a main type of traffic of the flow.

According to an embodiment, the processor 1401 may be configured to, when there are a plurality of types of traffic transmitted and received through the flow of the application, select one of the types of traffic as a main type of traffic of the application or the flow based on a traffic amount and a frequency of traffic generation (occurrence) for each type of traffic. In other words, the processor 1401 may be configured to determine a main type of traffic of each of the flows, or determine a main type of traffic of the application. According to an embodiment, the processor 1401 may be configured to, when there are a plurality of types of traffic transmitted and received through the flow of the application, select a type of traffic having a highest QoS priority, from among the types of traffic, as the main type of traffic of the application or the flow. According to an embodiment, the processor 1401 may be configured to determine the main type of traffic of the application or the flow after the traffic is transmitted and received a certain number of times or for a certain time through the flow of the application.

According to an embodiment, the processor 1401 may be configured to detect a change in performance with respect to the traffic of the application or the flow, and change the main type of traffic of the application or the flow based on a result of the detecting. For example, the processor 1401 may be configured to, when a traffic amount or a frequency of traffic generation (occurrence) of the application or the flow is changed by a certain amount or more, update the main type of traffic of the application or the flow.

According to an embodiment, the memory 1403 may be configured to store information about the changed QoS control policy applied to the flow. In addition, according to an embodiment, the memory 1403 may be configured to, when an amount, frequency, or type of traffic through the flow is changed by a certain amount or more, store the type of traffic updated by the processor 1401 and store information about an update time point.

According to an embodiment, the memory 1403 may include at least one of a flash memory-type storage medium, a hard disk-type storage medium, a multimedia card micro-type storage medium, a card-type memory (e.g., a secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

According to an embodiment, the transceiver 1405 may transmit and receive traffic. In addition, the transceiver 1405 may communicate with a base station and may include a radio frequency (RF) transmitter and an RF receiver converting and amplifying a frequency of a transmitted and received signal. However, the disclosure is not limited to the above example.

Figure 15:
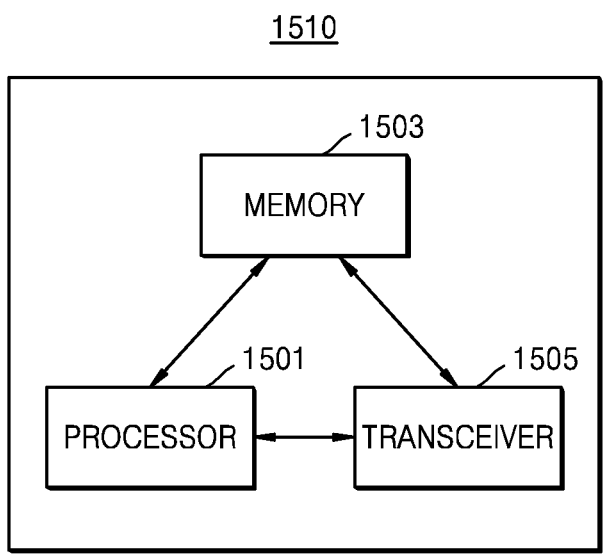
FIG. 15 is a block diagram of a network device for controlling QoS of an application, according to an embodiment.

FIG. 15 is a block diagram of a network device 1510 for controlling QoS of an application, according to an embodiment.

According to an embodiment, the QoS control device of the disclosure may be a network device 1510. The QoS control device may be the network device 1510 itself or a part of the network device 1510.

As illustrated in FIG. 15 the network device 1510 for controlling QoS according to an embodiment may include a processor 1501, a memory 1503, and a transceiver 1505. However, all the elements illustrated in FIG. 15 are not essential elements of the network device 1510. The network device 1510 may be implemented with more elements than the elements illustrated in FIG. 15 or may be implemented with fewer elements than the elements illustrated in FIG. 15. In addition, the processor 1501, the memory 1503, and the transceiver 1505 of the network device 1510 may be implemented in the form of a single chip.

According to an embodiment, the processor 1501 generally controls the overall operation of the network device 1510. For example, the processor 1501 may be configured to execute a program stored in the network device 1510 to generally control elements included in the network device 1510.

According to an embodiment, the processor 1501 may be configured to determine a main type of traffic of an application, determine a QoS control policy to be applied to each of a plurality of flows generated by execution of the application according to the determined main type of traffic, obtain performance information about traffic of the application using the traffic transmitted and received through the flows, and change a QoS control policy to be applied to at least one of the flows based on the obtained performance information about the traffic.

In addition, according to an embodiment, the processor 1501 may be configured to determine whether there are a plurality of types of traffic transmitted and received through a flow generated according to execution of the application, determine a main type of traffic of the flow according to a result of the determining, and determine a QoS control policy to be applied to the flow based on the determined main type of traffic. Because the operation of the processor 1501 may correspond to the operation of the processor 1401 of the terminal 101 described with reference to FIG. 14, a detailed description thereof will be omitted.

According to an embodiment, the memory 1503 may be configured to store information about the changed QoS control policy applied to the flow. In addition, according to an embodiment, the memory 1503 may be configured to, when an amount, frequency, or type of traffic through the flow is changed by a certain amount or more, store the type of traffic updated by the processor 1501 and store information about an update time point. Because the operation of the memory 1503 may correspond to the operation of the memory 1403 of the terminal 101 described with reference to FIG. 14, a detailed description thereof will be omitted.

According to an embodiment, the memory 1503 may include at least one of a flash memory-type storage medium, a hard disk-type storage medium, a multimedia card micro-type storage medium, a card-type memory (e.g., an SD or XD memory), a RAM, an SRAM, a ROM, an EEPROM, a PROM, a magnetic memory, a magnetic disk, and an optical disk.

According to an embodiment, the transceiver 1505 may transmit and receive traffic. In addition, the transceiver 1505 may communicate with a base station and may include an RF transmitter and an RF receiver converting and amplifying a frequency of a transmitted and received signal. However, the disclosure is not limited to the above example.

The device according to the disclosure may include a memory storing program data, a processor executing the program data, a permanent storage such as a disk drive, a communications port communicating with external devices, a user interface device including a display and a key, etc. Methods implemented as software modules or algorithms may be stored in a computer-readable recording medium as computer-readable codes or program commands executable on the processor. Examples of the computer-readable recording medium include a magnetic storage medium (e.g., a ROM, a RAM, a floppy disk, and a hard disk), an optical recording medium (e.g., a compact disc-ROM (CD-ROM) and a digital versatile disk (DVD), etc. The computer-readable recording medium may be distributed over network-coupled computer systems such that a computer-readable code is stored and executed in a distributed manner. The medium is readable by a computer, storable in a memory, and executable by a processor.

All documents including published documents, patent applications, and patents cited in the disclosure may be incorporated into the disclosure in the same manner as those indicated by individually and specifically incorporating the respective cited documents or those indicated by entirely incorporating the cited documents into the disclosure.

For the understanding of the disclosure, reference numerals are used in the preferred embodiments illustrated in the drawings, and specific terms are used to describe the embodiments of the disclosure. However, the disclosure is not limited to the specific terms, and the disclosure may include all elements that may be generally considered by one of ordinary skill in the art.

The disclosure may be described in terms of functional blocks and various processing operations. These functional blocks may be implemented with various numbers of hardware and/or software configurations that execute specific functions. For example, the disclosure may employ integrated circuit configurations such as memory, processing, logic, look-up tables, etc., capable of executing various functions under the control of one or more microprocessors or other control devices. Similar to the elements of the disclosure executable by software programming or software elements, the disclosure may be implemented in programming or scripting languages such as C, C++, Java, assembler, etc., including various algorithms implemented by a combination of data structures, processes, routines, or other programming elements. Functional aspects may be implemented by algorithms executed in one or more processors. In addition, the disclosure may employ the related art for electronic environment configuration, signal processing, and/or data processing. The terms "mechanisms", "elements", and "configurations" may be widely used and are not limited to mechanical or physical configurations. Such terms may include the meaning of a series of routines of software in connection with a processor or the like.

The specific executions described in the disclosure are merely examples, and do not limit the scope of the disclosure by any method. For the conciseness of the specification, descriptions of electronic configurations, control systems, and software of the related art and other functional aspects of such systems may be omitted. In addition, connections or connection members of lines between the elements illustrated in the drawings are illustrative examples of functional connections and/or physical or circuit connections, and may be represented as various functional connections, physical connections, or circuit connections that are replaceable or addable in real devices. In addition, unless specified, such as "essential", "necessary", etc., it may not be an essential element for application of the disclosure.

The use of the term "the" and similar referents in the context of describing the specification (in particular, the claims) of the disclosure, is construed to cover both singular and plural forms. In addition, when a range is described in the disclosure, it is to be understood that the disclosure includes individual values belonging to the range (unless there is a particular opposing recitation) and is the same as describing the individual values constituting the range in the detailed description of the disclosure. Finally, the operations of all methods according to the disclosure may be performed in any suitable order unless clearly indicated herein or otherwise contradicted by context. The disclosure is not necessarily limited to the sequence of operations described above. The use of all examples or exemplary terms (e.g., such as) provided herein is intended merely to better illuminate the disclosure and does not pose a limitation on the scope of the disclosure unless otherwise claimed. In addition, one of ordinary skill in the art may understand that various modifications, combinations, and changes may be made according to design conditions and factors within the scope of the appended claims or equivalents thereof.

The invention claimed is:

1. A method of controlling Quality of Service (QoS) of an application, the method comprising:
   determining a main type of traffic of the application, the main type of traffic being a type of traffic that represents a plurality of types of traffic transmitted and received by execution of the application;
   determining a QoS control policy to be applied to each of a plurality of flows generated by execution of the application according to the determined main type of traffic;
   obtaining performance information about traffic of the application using traffic transmitted and received through the plurality of flows; and
   changing a QoS control policy to be applied to at least one of the plurality of flows, based on the obtained performance information about the traffic,
   wherein at least one type of traffic is transmitted or received via the each of the plurality of flows.

2. The method of claim 1, wherein the obtaining of the performance information about the traffic of the application further comprises obtaining performance information about traffic of each of the plurality of flows, and
   the changing of the QoS control policy comprises selecting a flow to which a QoS control policy is to be changed and then applied, from among the plurality of flows, based on at least one of the obtained performance information about the traffic of the application and the obtained performance information about the traffic of each of the plurality of flows.

3. The method of claim 2, wherein the changing of the QoS control policy comprises changing the QoS control policy to increase a QoS priority to be applied to the selected flow, and
   the method further comprises, after the QoS control policy is changed, checking whether a change occurs in at least one of performance with respect to the traffic of the application and performance with respect to the traffic of each of the plurality of flows.

4. The method of claim 3, further comprising:
   based on a result of the checking, determining whether to maintain the changed QoS control policy applied to the selected flow; and
   storing information about the changed QoS control policy applied to the selected flow.

5. The method of claim 4, further comprising, when the application is re-executed, determining a QoS control policy to be applied to the selected flow based on the stored information about the changed QoS control policy.

6. The method of claim 1, wherein the determining of the main type of traffic of the application comprises, when a plurality of types of traffic are transmitted or received through the flows of the application, determining one of the plurality of types of traffic as a main type of traffic of the application based on at least one of a traffic amount and a frequency of traffic generation or occurrence for each type of traffic.

7. The method of claim 1, wherein the determining of the main type of traffic of the application comprises, when a plurality of types of traffic are transmitted or received through the flows of the application, determining a type of traffic having a highest QoS priority, from among the plurality of types of traffic, as a main type of traffic of the application.

8. The method of claim 1, wherein the determining of the main type of traffic of the application comprises determining a main type of traffic of the application after traffic is transmitted and received a certain number of times or for a certain length of time through the flows of the application.

9. The method of claim 6, wherein the determining of the main type of traffic of the application further comprises:
   when the traffic amount or the frequency of traffic generation or occurrence of the application is changed by a certain amount or more, updating the main type of traffic of the application; and
   storing information about the updated main type of traffic and information about a change time point.

10. A method of determining Quality of Service (QoS) of an application, the method comprising:
    determining whether a plurality of types of traffic are transmitted or received through a flow generated according to execution of the application;
    determining a main type of traffic of the flow according to a result of the determining, the main type of traffic being a type of traffic that represents a plurality of types of traffic transmitted and received through the flow; and
    determining a QoS control policy to be applied to the flow, based on the determined main type of traffic,
    wherein at least one type of traffic is transmitted or received via the flow.

11. The method of claim 10, wherein the determining of the main type of traffic of the flow comprises determining one of the plurality of types of traffic as the main type of traffic based on at least one of a traffic amount and a frequency of traffic generation or occurrence for each type of traffic transmitted and received through the flow.

12. The method of claim 10, wherein the determining of the main type of traffic of the flow comprises determining a type of traffic having a highest QoS priority, from among the plurality of types of traffic, as the main type of traffic of the flow.

13. The method of claim 10, further comprising:
   obtaining performance information about traffic of the flow; and
   changing the main type of traffic of the flow, based on the obtained performance information with respect to the traffic of the flow.

14. A device for controlling Quality of Service (QoS) of an application, the device comprising:
   a transceiver; and
   at least one processor,
   wherein the at least one processor is configured to determine a main type of traffic of the application, the main type of traffic being a type of traffic that represents a plurality of types of traffic transmitted and received by execution of the application, determine a QoS control policy to be applied to each of a plurality of flows generated according to execution of the application, based on the determined main type of traffic, obtain performance information about traffic of the application transmitted and received through the plurality of flows, and change a QoS control policy to be applied to at least one of the plurality flows, based on the obtained performance information about the traffic, and
   wherein at least one type of traffic is transmitted or received via the each of the plurality of flows.

15. A device for controlling a Quality of Service (QoS) control policy of an application, the device comprising:
   a transceiver; and
   at least one processor,
   wherein the at least one processor is configured to determine whether there are a plurality of types of traffic transmitted and received through a flow generated according to execution of the application, determine a main type of traffic of the flow according to a result of the determining, wherein the main type of traffic being a type of traffic that represents a plurality of types of traffic transmitted and received through the flow, and determine a QoS control policy to be applied to the flow, based on the determined main type of traffic, and
   wherein at least one type of traffic is transmitted or received via the flow.

\* \* \* \* \*